(12) United States Patent
Shimizu et al.

(10) Patent No.: US 12,031,815 B2
(45) Date of Patent: Jul. 9, 2024

(54) MAGNETIC LINEAR SENSOR

(71) Applicant: Murata Machinery, Ltd., Kyoto (JP)

(72) Inventors: Tetsuya Shimizu, Kyoto (JP); Ryohei Kido, Kyoto (JP)

(73) Assignee: Murata Machinery, Ltd., Kyoto (JP)

( * ) Notice: Subject to any disclaimer, the term of this patent is extended or adjusted under 35 U.S.C. 154(b) by 218 days.

(21) Appl. No.: 17/600,621

(22) PCT Filed: Feb. 19, 2020

(86) PCT No.: PCT/JP2020/006532
§ 371 (c)(1),
(2) Date: Oct. 1, 2021

(87) PCT Pub. No.: WO2020/202864
PCT Pub. Date: Oct. 8, 2020

(65) Prior Publication Data
US 2022/0163313 A1  May 26, 2022

(30) Foreign Application Priority Data

Apr. 2, 2019  (JP) ................. 2019-070439

(51) Int. Cl.
*G01B 7/00* (2006.01)
*G01D 5/20* (2006.01)

(52) U.S. Cl.
CPC ........... *G01B 7/003* (2013.01); *G01D 5/2086* (2013.01)

(58) Field of Classification Search
CPC .. G01D 5/2452; G01D 5/2046; G01D 5/2086; G01D 5/2451; G01B 7/003
See application file for complete search history.

(56) References Cited

U.S. PATENT DOCUMENTS 5,804,963 A    9/1998 Meyer
6,054,851 A *  4/2000 Masreliez ............ G01D 5/2053
                                                    341/15

(Continued)

FOREIGN PATENT DOCUMENTS

JP    H09-210611 A    8/1997
JP    H11-223505 A    8/1999

(Continued)

OTHER PUBLICATIONS

Notice of Reasons for Refusal dated Jan. 13, 2023, of counterpart Japanese Patent Application No. 2019-070439, along with an English translation.

*Primary Examiner* — Eman A Alkafawi
*Assistant Examiner* — Suresh K Rajaputra
(74) *Attorney, Agent, or Firm* — DLA Piper LLP (US)

(57) ABSTRACT

A magnetic response section provided by a scale of a magnetic linear sensor is configured so that changes in magnetic influence on a magnetic detection head appear alternately and repeatedly every first pitch in a displacement detection direction. The magnetic detection head is provided on one side of the scale in the first direction, which is a direction perpendicular to the displacement detection direction, and provided with a base substrate section and a plurality of signal output sections. The signal output sections are arranged on an insulating plate and in the displacement detection direction at a second pitch based on a first pitch. The first conductive pattern and the second conductive pattern included by each of the signal output sections are formed to arrange coil elements side by side in an elongated area in a second direction orthogonal to both the displacement detection direction and the first direction.

11 Claims, 11 Drawing Sheets

(56) References Cited

U.S. PATENT DOCUMENTS

| | | | | |
|---|---|---|---|---|
| 2001/0020846 A1* | 9/2001 | Miyata | ................ | G01D 5/2093 |
| | | | | 324/207.17 |
| 2006/0001518 A1* | 1/2006 | Hayashi | ............... | G01D 5/2046 |
| | | | | 336/200 |
| 2009/0174396 A1* | 7/2009 | Howard | ............... | G01D 5/2053 |
| | | | | 324/207.24 |
| 2017/0350728 A1* | 12/2017 | Tiemann | ............. | G01D 5/2053 |

FOREIGN PATENT DOCUMENTS

| | | |
|---|---|---|
| JP | 2002-090176 A | 3/2002 |
| JP | 2002-148002 A | 5/2002 |
| JP | 2005-156348 A | 6/2005 |
| JP | 2006-017533 A | 1/2006 |
| JP | 2008-286667 A | 11/2008 |
| JP | 4392228 B2 | 12/2009 |
| JP | 2017-219547 A | 12/2017 |

* cited by examiner variation example

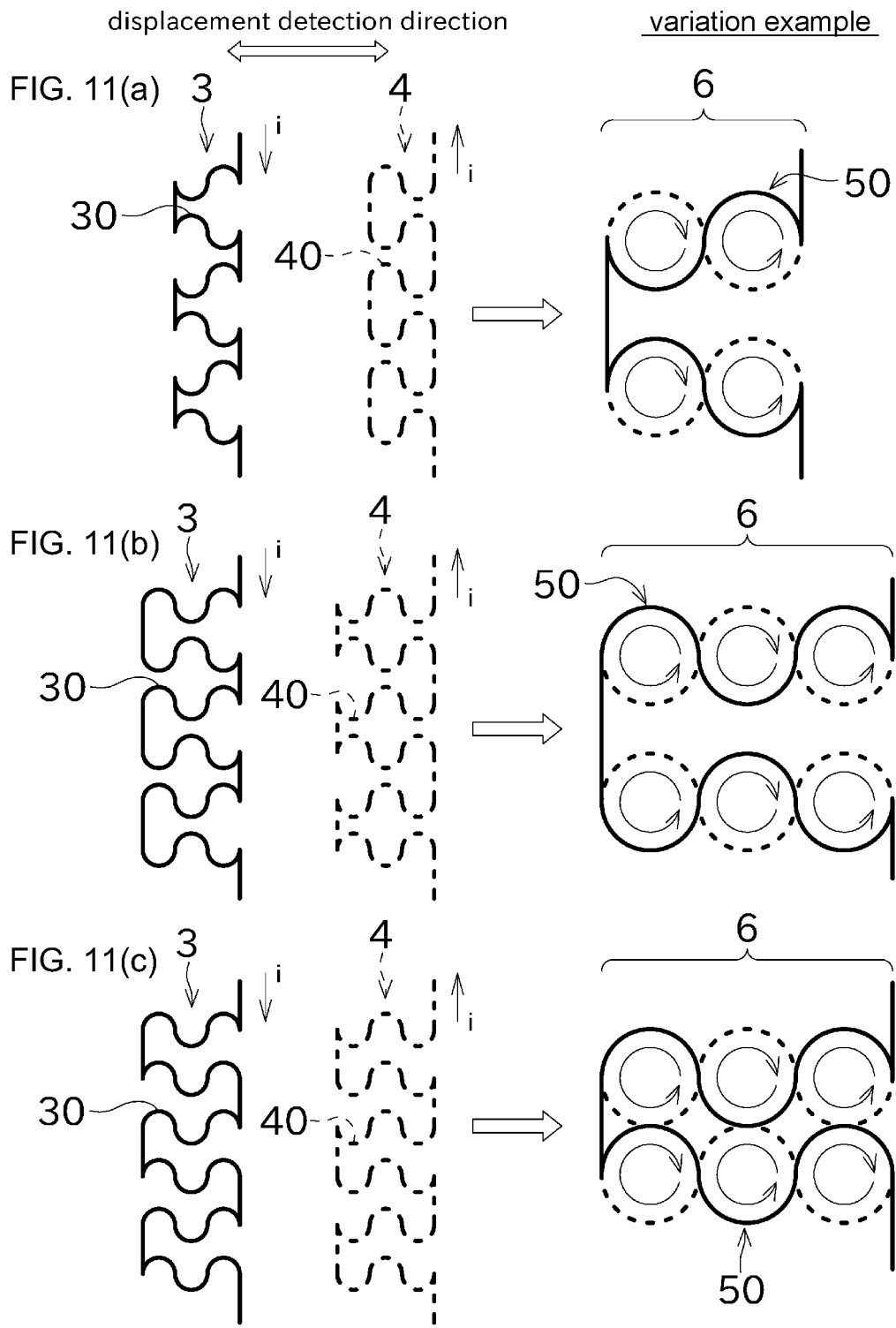

MAGNETIC LINEAR SENSOR

TECHNICAL FIELD

This disclosure relates to a magnetic linear sensor that detects displacement of a measurement target.

BACKGROUND

Conventionally, displacement sensors that measure the displacement of a measurement target using electromagnetic induction phenomena have been known. Japanese Unexamined Patent Application Publication No. 2002-90176 discloses a displacement sensor of that type.

The electromagnetic induction type displacement sensor of JP '176 comprises a plurality of stacked pair sheets. Each pair of sheets comprises a first sheet having a plurality of arc-shaped first conductive patterns formed concentrically and having a hole in a center; and a second sheet having a plurality of second conductive patterns formed complementary to the first conductive patterns and having a hole in a center. A magnetic material is inserted into a hollow formed by the stacking of the holes.

To obtain a larger detection signal, it is considered to increase the number of concentric circles formed by the first conductive pattern in each pair sheets in the configuration of JP '176. However, the size of the first conductive pattern in the radial direction increases. It is also possible to increase the number of stacked pair sheets, but, if configured that way, the size in the axial direction increases.

It could therefore be helpful to improve detection accuracy and miniaturization in a magnetic linear sensor.

SUMMARY

We thus provide a magnetic linear sensor having the following configuration. That is, this magnetic linear sensor detects a displacement of a measurement target in a displacement detection direction. The magnetic linear sensor includes a linear scale and a sensor head. The sensor head is displaceable relative to the linear scale in the displacement detection direction. The sensor head is placed on one side of the linear scale in a first direction which is a direction perpendicular to the displacement detection direction. The linear scale includes a first magnetic response section placed on the side facing the sensor head. The first magnetic response section is configured such that changes in magnetic influence on the sensor head appear alternately and repeatedly at every first pitch in the displacement detection direction. The sensor head includes a base substrate section and a plurality of detection sections. The base substrate section includes at least one insulating plate. The detection sections are placed on the insulating plate and are arranged in the displacement detection direction at every second pitch which is based on the first pitch. Each of the detecting sections includes a first conductive pattern, a second conductive pattern, and a through hole. The second conductive pattern is formed at a position different from the first conductive pattern in the thickness direction of the insulating plate. The through hole electrically conducts the first conductive pattern and the second conductive pattern. The first conductive pattern and the second conductive pattern are formed to arrange coil elements side by side in an elongated area in a second direction which is orthogonal to both the displacement detection direction and the first direction. The first conductive pattern has a shape of single stroke connecting a plurality of first unit elements constituting the coil elements. The second conductive pattern has a shape of single stroke connecting a plurality of second unit elements constituting the coil elements. The first unit element and the second unit element constitute a closed shape of the coil element when viewed in the thickness direction of the base substrate section.

As a result, the detection section is configured by a conductive pattern that is easy to precisely process. Consequently, the arrangement pitch of the detection section in the sensor head can be reduced. Therefore, the first pitch, which is the detection pitch of the linear sensor, can be made smaller. Accordingly, the linear sensor can be made smaller, and the detection accuracy can be improved. And, a plurality of coil elements can be configured from the first pattern and the second pattern, and a large detection signal can be retrieved. In particular, it is easy to enlarge a number of coil elements by the layout in which the coil elements are arranged in an elongated area in the second direction.

It is preferable that the magnetic linear sensor is configured as follows. That is, this magnetic linear sensor includes a plurality of detection sets. Each of the detection sets includes the first conductive pattern, the second conductive pattern, and the through hole. Each of the plurality of the detection sections has a plurality of the detection sets stacked in the thickness direction of the base substrate section.

As a result, a compact configuration can be achieved by making the detection section a multilayer structure.

It is possible that the magnetic linear sensor is configured as follows. That is, the plurality of the detection sets include a first detection set and a second detection set. The first detection set constitutes a primary coil that generates an AC magnetic field. The second detection set constitutes a secondary coil that outputs an AC signal induced by the AC magnetic field. The primary coil and the secondary coil face each other in the thickness direction of the base substrate section.

As a result, the primary coil, which generates the AC magnetic field, and the secondary coil, which outputs the AC signal, can be compactly configured as a whole. In addition, the primary coil and the secondary coil can be arranged in close proximity to each other so that a configuration with good sensitivity can be provided.

It is possible that the magnetic linear sensor is configured as follows. That is, this magnetic linear sensor includes a plurality of detection sets. Each of the detection sets includes the first conductive pattern, the second conductive pattern, and the through hole. The plurality of the detection sets include a first detection set and a second detection set. The first detection set constitutes a primary coil that generates an AC magnetic field. The second detection set constitutes a secondary coil that outputs an AC signal induced by the AC magnetic field. The first conductive pattern and the second conductive pattern constituting the secondary coil are placed between the first conductive pattern and the second conductive pattern constituting the primary coil in the thickness direction of the base substrate section.

This allows for a compact arrangement of the primary coil and the secondary coil.

It is preferable that the magnetic linear sensor is configured as follows. That is, the first conductive pattern includes a plurality of first element rows which are arranged in the displacement detection direction. Each of the first element rows includes the plurality of the first unit elements which are arranged in the second direction. The second conductive pattern includes a plurality of second element rows which are arranged in the displacement detection direction. Each of the second element rows includes the plurality of the second unit elements which are arranged in the second direction.

This allows the matrix arrangement of the coil elements to be easily realized.

It is possible that the magnetic linear sensor is configured as follows. That is, the plurality of detection sections include a first detection section, a second detection section, a third detection section, and a fourth detection section. The first detection section outputs an AC signal. The second detection section outputs an AC signal whose phase is 90° different from that of the first detection section. The third detection section outputs an AC signal whose phase is 180° different from that of the first detection section. The fourth detection section outputs an AC signal whose phase is 270° different from that of the first detection section. The first detection section, the second detection section, the third detection section, and the fourth detection section are arranged in order in the displacement detection direction.

This allows the plurality of detection sections to be configured in a simplified manner as a whole.

It is preferable that the magnetic linear sensor is configured as follows. That is, the magnetic linear sensor includes a first detection section, a second detection section, a third detection section, and a fourth detection section. The first detection section outputs an AC signal. The second detection section outputs an AC signal whose phase is 90° different from that of the first detection section. The third detection section outputs an AC signal whose phase is 180° different from that of the first detection section. The fourth detection section outputs an AC signal whose phase is 270° different from that of the first detection section. The first detection section and the third detection section are placed adjacent to each other in the displacement detection direction. The second detection section and the fourth detection section are placed adjacent to each other in the displacement detection direction.

This makes it easy to reduce the first pitch even if it is difficult to reduce the spacing of the detection sections, for example, due to physical limitations of the layout. Thus, the detection accuracy can be improved.

It is preferable that the magnetic linear sensor is configured as follows. That is, the magnetic linear sensor includes a first detection section, a second detection section, a third detection section, and a fourth detection section. The first detection section outputs an AC signal. The second detection section outputs an AC signal whose phase is 90° different from that of the first detection section. The third detection section outputs an AC signal whose phase is 180° different from that of the first detection section. The fourth detection section outputs an AC signal whose phase is 270° different from that of the first detection section. First coil element rows and third coil element rows are alternately arranged in the displacement detection direction. Each of the first coil element rows comprises the first element row and the second element row which constitute the first conductive pattern and the second conductive pattern included by the first detection section. Each of the third coil element rows comprises the first element row and the second element row which constitute the first conductive pattern and the second conductive pattern included by the third detection section. Second coil element rows and fourth coil element rows are alternately arranged in the displacement detection direction. Each of the second coil element rows comprises the first element row and the second element row which constitute the first conductive pattern and the second conductive pattern included by the second detection section. Each of the fourth coil element rows comprises the first element row and the second element row which constitute the first conductive pattern and the second conductive pattern included by the fourth detection section.

This makes it easy to reduce the first pitch even if it is difficult to reduce the spacing between the detection sections, for example, due to physical limitations of the layout. Thus, the detection accuracy can be improved.

It is preferable that the magnetic linear sensor is configured as follows. That is, the magnetic linear sensor includes a signal processing unit for processing signals output from the first detection section, the second detection section, the third detection section, and the fourth detection section. The signal processing unit retrieves the displacement of the measurement target based on a first AC signal and a second AC signal. The first AC signal corresponds to a difference between the outputs of the first detection section and the third detection section. The second AC signal corresponds to a difference between the outputs of the second detection section and the fourth detection section.

As a result, the displacement of the measurement target within the first pitch can be accurately detected.

It is preferable that the magnetic linear sensor is configured as follows. That is, the linear scale includes a second magnetic response section. The second magnetic response section is configured such that changes in magnetic influence on the sensor head appear alternately and repeatedly at every magnetic change pitch in the displacement detection direction. The magnetic change pitch is different from the first pitch. The sensor head includes a plurality of magnetic detection sections. The plurality of the magnetic detection sections are arranged in the displacement detection direction at every pitch which is based on the magnetic change pitch.

This allows the position of the measurement target to be retrieved more appropriately using two magnetic response sections whose magnetic influence changes at different pitches from each other.

In the magnetic linear sensor, it is preferable that the linear scale is provided on each of both sides of the sensor head in the first direction to sandwich the sensor head.

As a result, a larger detection signal can be easily retrieved.

BRIEF DESCRIPTION OF THE DRAWINGS

FIGS. 11(a)-11(c) are plan views showing a configuration of a first conductive pattern and a second conductive pattern of yet another example.

Figure 1:
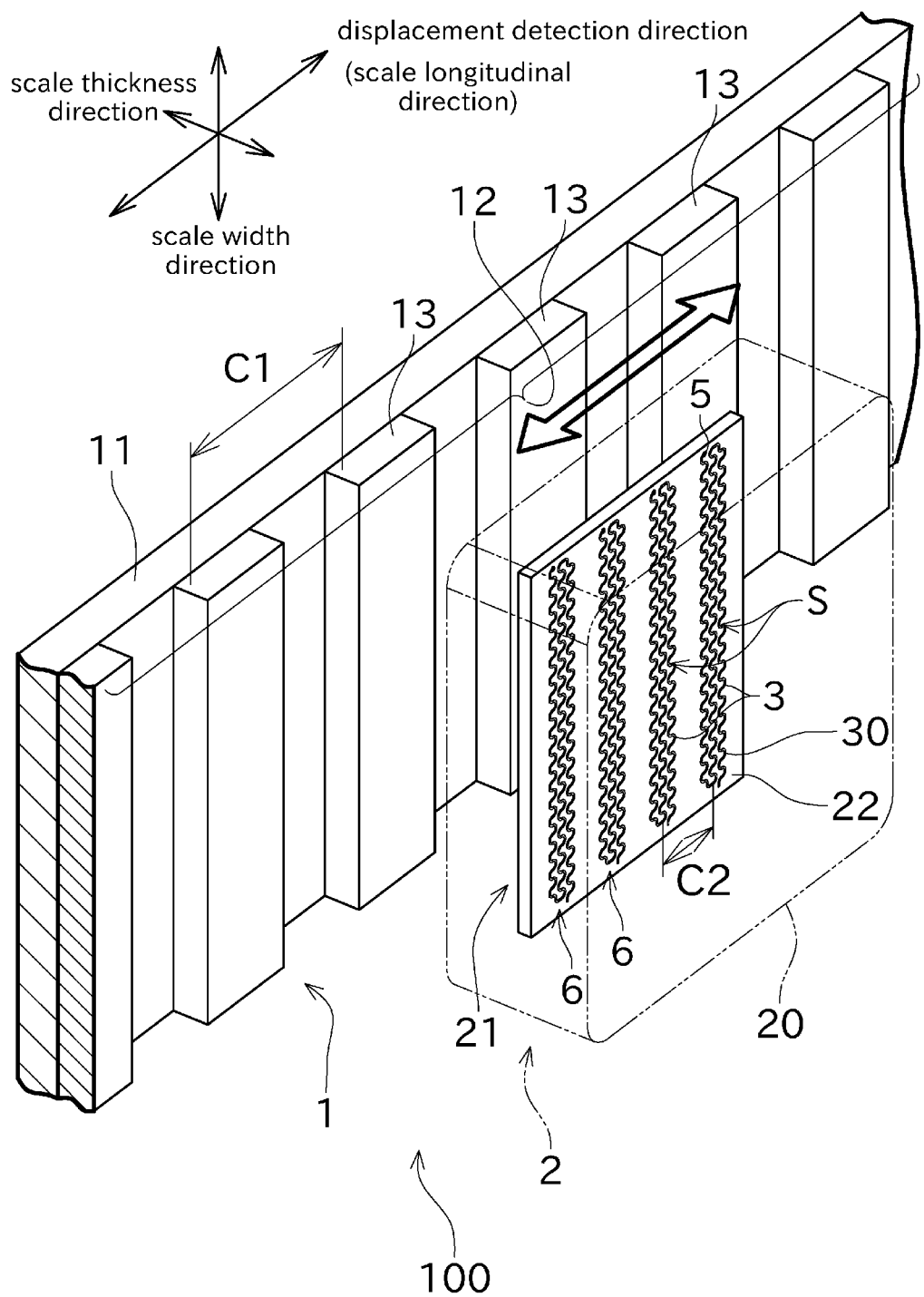
FIG. 1 is a diagonal view of a magnetic linear sensor according to a first example.

DESCRIPTION OF THE REFERENCE NUMERALS 1 scale (linear scale)
2 magnetic detection head (sensor head)
3 first conductive pattern
4 second conductive pattern
5 through hole
6 signal output section (detection section)
6a first signal output section (first detection section)
6b second signal output section (second detection section)
6c third signal output section (third detection section)
6d fourth signal output section (fourth detection section)
7 signal processing unit
12 magnetic response section (first magnetic response section)
14 second magnetic response section
22 base substrate section
22a insulation plate
30 first unit element
31 first element row
40 second unit element
41 second element row
50 coil element
51 first coil element row
52 second coil element row
53 third coil element row
54 fourth coil element row
61 primary coil
652 secondary coil
100 magnetic linear sensor
100x magnetic linear sensor
C1 first pitch
C2 second pitch
S unit detection set (detection set)
y1 first AC signal
y2 second AC signal

DETAILED DESCRIPTION

Next, an example of our sensor will be described with reference to the drawings. FIG. 1 is a diagonal view showing a configuration of a magnetic linear sensor 100 according to a first example.

The magnetic linear sensor 100 shown in FIG. 1 is used to detect a displacement of a measurement target in a predetermined direction. In the following description, the direction in which the displacement of the measurement target is detected may be referred to as a displacement detection direction.

The magnetic linear sensor 100 mainly comprises a scale (linear scale) 1 and a magnetic detection head (sensor head) 2.

Any one of the scale 1 and the magnetic detection head 2 is mounted to a measurement target. In this example, the scale 1 is mounted to a fixed member not shown in the figure, and the magnetic detection head 2 is mounted to a movable member not shown in the figure, which is a measurement target. The movable member is linearly movable along a path parallel to the displacement detection direction.

However, the scale 1 may be mounted to the movable member, which is the measurement target, and the magnetic detection head 2 may be mounted to the fixed member. Further, both the scale 1 and the magnetic detection head 2 may be mounted on movable members that is displaced relative to each other, respectively. In this example, the magnetic linear sensor 100 detects the relative displacement of the measurement target.

As shown in FIG. 1, the scale 1 is formed in the form of an elongated block. The scale 1 is used as graduations for detecting the displacement of the measurement target in the longitudinal direction of the scale 1. The scale 1 is formed elongated in a direction parallel to a movement stroke to include the movement stroke of the magnetic detection head 2 accompanying the movement of the movable member.

The scale 1 is formed in the form of an elongated rectangular plate. The longitudinal direction of the scale 1 coincides with the displacement detection direction. The thickness direction and the width direction of the plate-shaped scale 1 are both orthogonal to the displacement detection direction. In the following, the longitudinal direction of the scale 1 may be referred to as a scale longitudinal direction, the thickness direction may be referred to as a scale thickness direction, and the width direction may be referred to as a scale width direction. The scale thickness direction corresponds to the first direction and the scale width direction corresponds to the second direction.

The scale 1 has a base member 11 and a magnetic response section (first magnetic response section) 12.

The base member 11 is configured as an elongated plate-like member made of a material such as, for example, a metal having no pronounced magnetism or plastic having no magnetism.

The magnetic response section 12 is provided on one side of the base member 11 in the thickness direction, as shown in FIG. 1. The magnetic response section 12 comprises a number of ferromagnetic portions 13 arranged and fixed in the longitudinal direction of the base member 11. Each of the ferromagnetic portions 13 is formed in the form of an elongated plate extending in the scale width direction.

The ferromagnetic portions 13 comprise, for example, a metal or the like having ferromagnetic properties. However, the ferromagnetic portion 13 is not limited to a plate shape, but can also be formed into a rectangular shape, a rod shape, or the like, for example.

The ferromagnetic portions 13 are arranged in the longitudinal direction of the scale 1 at every predetermined first pitch C1. Since the ferromagnetic portions 13 are arranged side by side while forming a predetermined interval, a non-magnetic (or weak) portion is formed between two ferromagnetic portions 13 adjacent to each other. Accordingly, in the magnetic response section 12, the presence/absence or the strength/weakness of the magnetic responsiveness appears alternately and repeatedly at every first pitch C1 in the longitudinal direction of the scale 1.

As shown in FIG. 1, the magnetic detection head 2 is provided on one side of the scale 1 in the scale thickness direction to face the magnetic response section 12. The magnetic detection head 2 is disposed at a predetermined interval from the scale 1 in the scale thickness direction.

The magnetic detection head 2 mainly includes a printed circuit board 21 housed in a case 20. An induction current induced by the magnetic field strengthened by the magnetic response section 12 flows in the conductive pattern described below formed on the printed circuit board 21. The magnetic detection head 2 is capable of detecting an electric signal (e.g., a voltage signal) based on this induced current.

As shown in FIG. 1, the printed circuit board 21 of this example is provided so that its thickness direction coincides with the scale thickness direction. The printed circuit board 21 comprises, for example, as shown in FIG. 2, a four-layer substrate in which three insulating plates 22a and four conductor layers are alternately stacked in the thickness direction.

From the viewpoint of signal detection, the printed circuit board 21 comprises a base substrate section (insulating substrate) 22 and a plurality of signal output sections (detection sections) 6. The base substrate section 22 includes the three insulating plates 22a described above.

Each signal output section 6 has a first conductive pattern 3 and a second conductive pattern 4 formed in the above-mentioned conductor layer, and a through hole 5. The through hole 5 electrically conducts the first conductive pattern 3 and the second conductive pattern 4. In the following description, each of the conductor layers may be referred to as a first conductor layer 21a, a second conductor layer 21b, a third conductor layer 21c, and a fourth conductor layer 21d, in order from the side farthest from the scale 1, for identifying each of the conductor layers.

Figure 2:
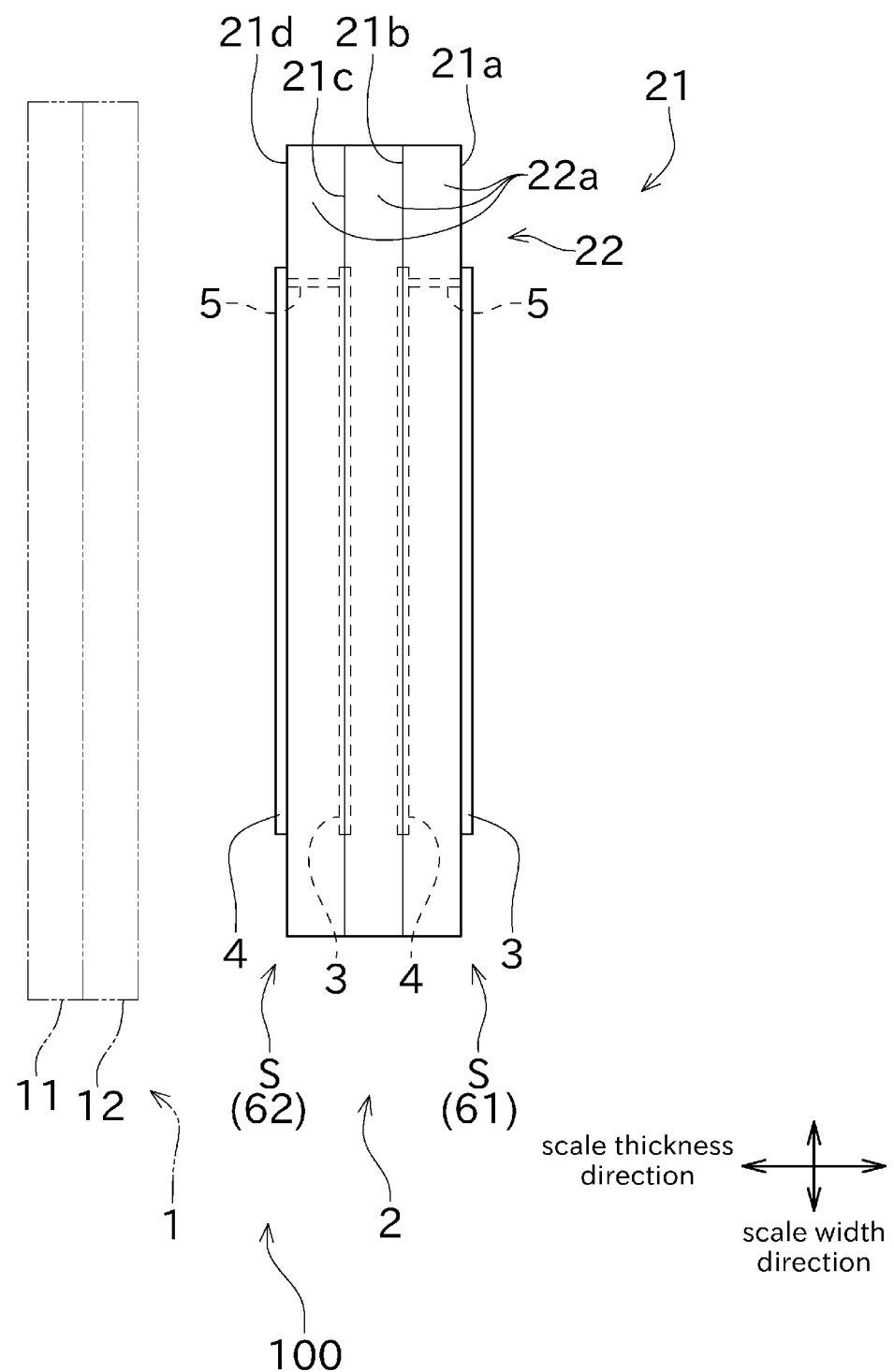
FIG. 2 is a side view schematically showing a configuration of a magnetic sensing head.

As shown in FIG. 2, the first conductive pattern 3 is formed in the first conductor layer 21a located on one side in the thickness direction of the base substrate section 22. Specifically, the first conductive pattern 3 is configured by forming a conductor comprising a copper foil or the like constituting the first conductor layer 21a into a predetermined shape by pattern etching or the like.

Figure 3:
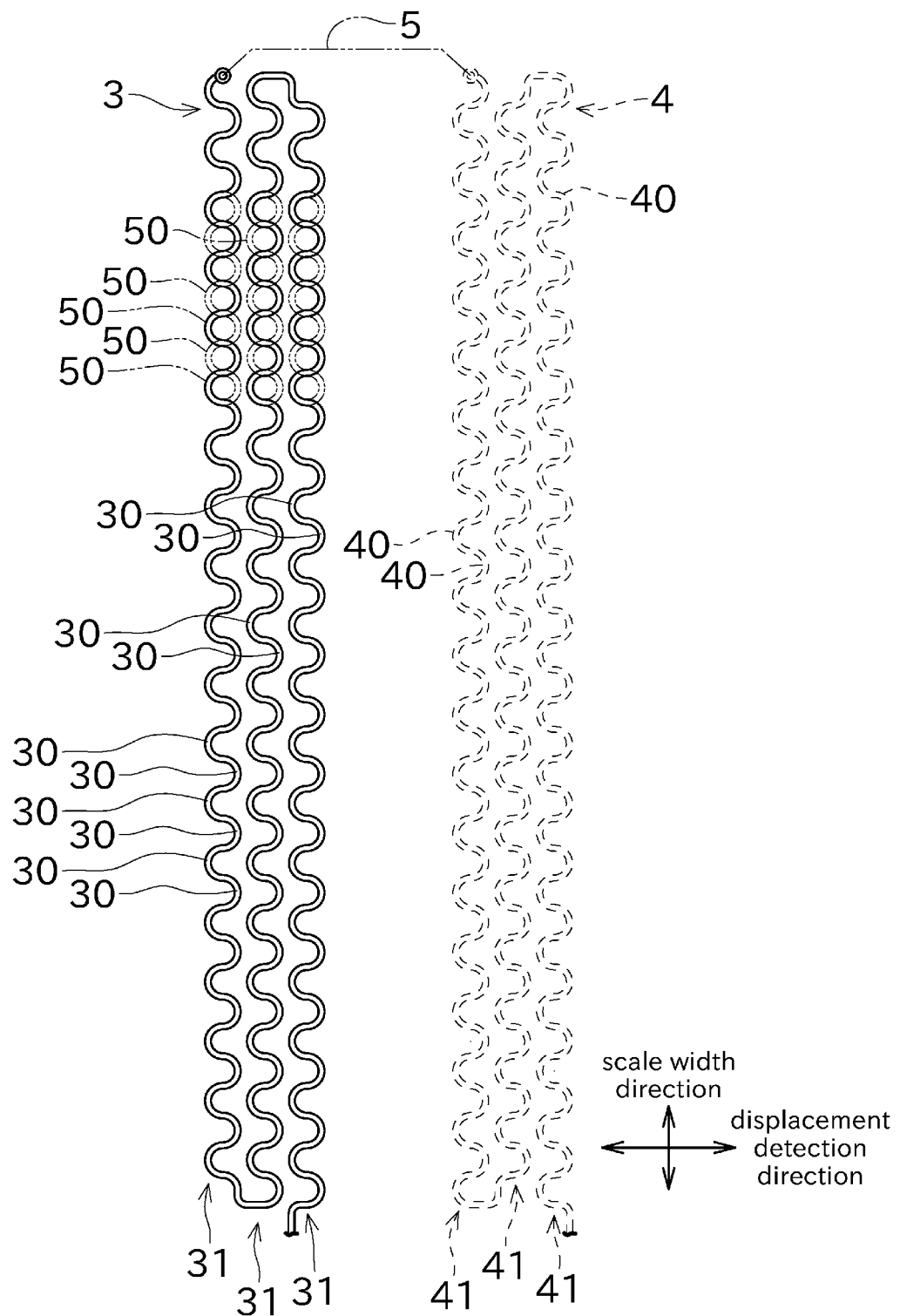
FIG. 3 is a diagram illustrating the correspondence of a first conductive pattern and a second conductive pattern.
Figure 4:
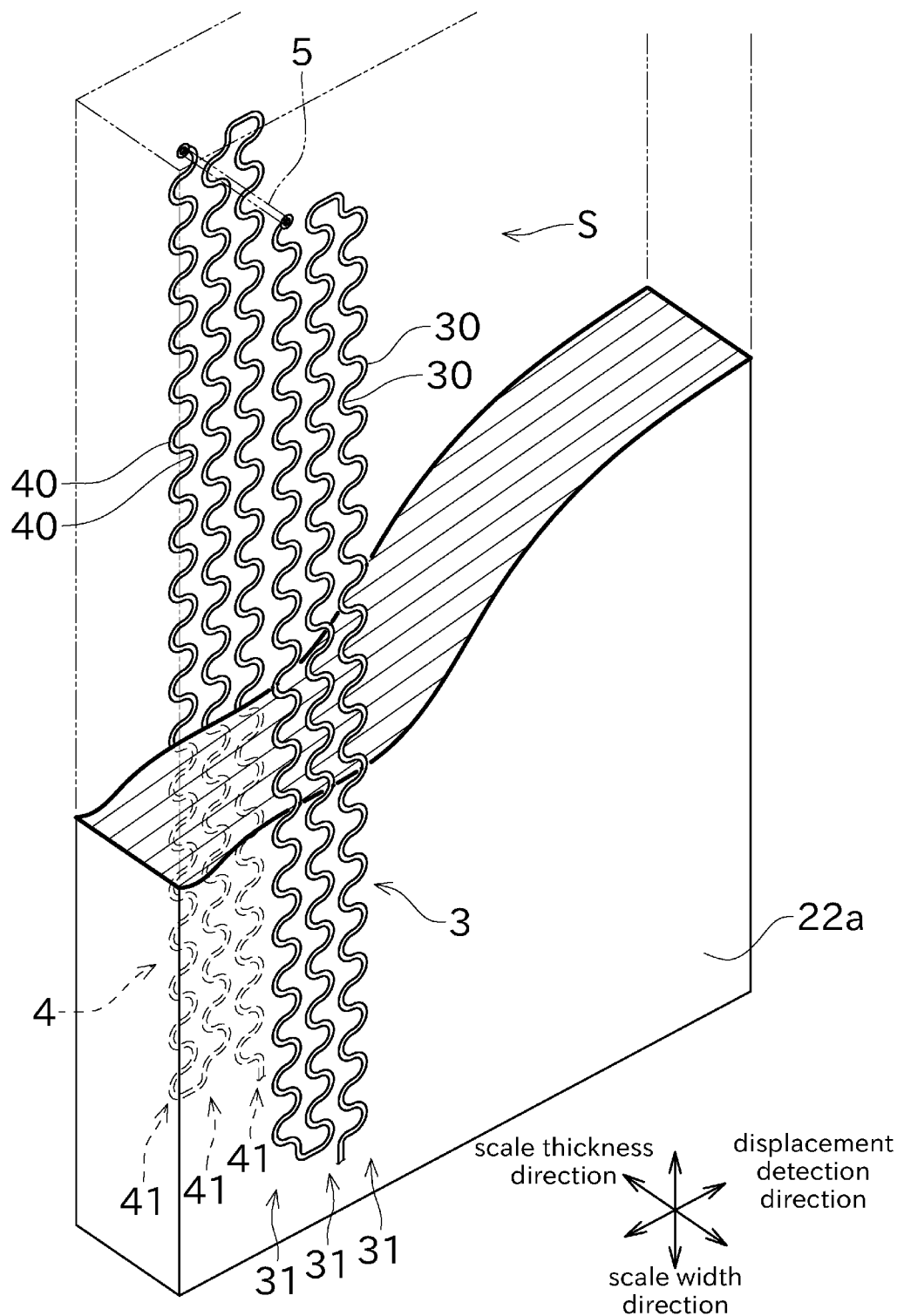
FIG. 4 is a diagonal view showing the shapes of the first conductive pattern and the second conductive pattern.
Figure 5:
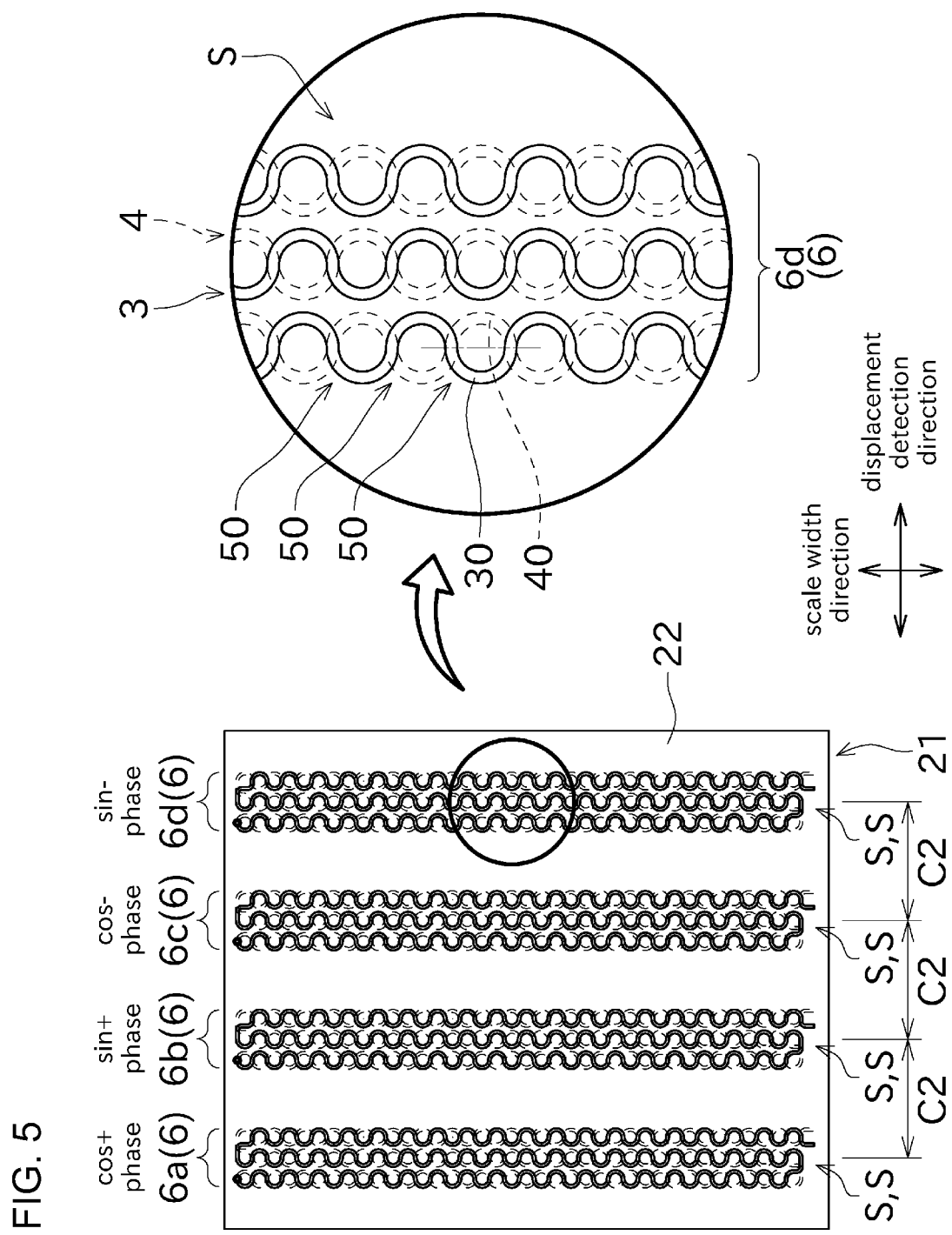
FIG. 5 is a front view showing the configuration of a printed circuit board.

As shown in FIG. 1, the first conductive pattern 3 is arranged in an elongated region in the scale width direction. The first conductive pattern 3 has a shape of single stroke constituted by a plurality of first unit elements 30, as shown in FIGS. 3 to 5.

Each of the first unit elements 30 is formed in a semicircular arc shape. The first unit elements 30 are arranged in an elongated area in the scale width direction in a matrix of p×q. FIG. 3 shows an example where p=38 and q=3. The diameter of all first unit elements 30 is the same. The first unit elements 30 are arranged side by side at equal intervals in both the row direction and the column direction.

Excluding the first unit element 30 located at the end of the scale width direction, when focusing on any two first unit elements 30 adjacent to each other in the scale width direction, these two first unit elements 30 have an inverted shape with respect to each other. In other words, when focusing on the sequence of the first unit elements 30 in the scale width direction, the semicircular arc corresponding to the respective first unit elements 30 alternate in phase by 180° for each one. In each of the first unit elements 30, both ends of the pattern lines of the semicircular arc are located on both sides of the scale width direction relative to the center of the semicircular arc.

In the first conductive pattern 3 of this example, all of the plurality of first unit elements 30 are integrally connected to other adjacent first unit elements 30. In principle, the first unit elements 30 are connected to adjacent first unit elements 30 in the scale width direction. As described above, since the two adjacent first unit elements 30 in the scale width direction are arranged inverted with respect to each other, when they are connected to each other, the two first unit elements 30 form an S-shape as a whole.

However, the first unit element 30 located at the end of the scale width direction is exceptionally connected to an adjacent first unit element 30 in the displacement detection direction.

Focusing on the sequence of the first unit elements 30 in the scale width direction, the pattern lines of the first conductive pattern 3 reach from one end in the scale width direction to the opposite end while connecting the first unit elements 30 one after another in a bead-like manner repeating the S-shape. In this way, an elongated pattern line is formed in the scale width direction as a whole although it includes repetition of fine curved portions.

The first conductive pattern 3 is composed of three such pattern lines in the displacement detection direction. Each of the pattern lines extends in the scale width direction. The three pattern lines are directed substantially parallel to each other. Each pattern line is integrally connected to an adjacent pattern line at an end in the scale width direction.

The first conductive pattern 3 includes three pattern lines connected to each other at their longitudinal ends to make one and a half trips from one end to the other end in the scale width direction. More specifically, one end of the first conductive pattern 3 is disposed at an appropriate position on one end side (lower side in FIG. 3) in the scale width direction. In the following, this position may be referred to as the starting end portion (pattern first end portion). The first conductive pattern 3 extends from the starting end portion toward the other end side (upper side in FIG. 3). When the first conductive pattern 3 reaches the other end side in the scale width direction, the first conductive pattern 3 folds back while slightly changing its position in the displacement detection direction, and extends toward the one end side (the side with the starting end portion) in the scale width direction. When the first conductive pattern 3 reaches the one end side in the scale width direction, the first conductive pattern 3 folds back again while changing its position slightly in the displacement detection direction, and extends toward the other end side (the side opposite the starting end portion) in the scale width direction. When the first conductive pattern 3 reaches the other end side in the scale width direction, the position becomes the other end of the first conductive pattern 3. In the following, this position may be referred to as the terminal end portion (pattern second end portion). The first conductive pattern 3 is connected to the through hole 5 at this terminal end portion.

The starting end portion and terminal end portion are located at ends that are opposite to each other in the scale width direction, respectively. The first conductive pattern 3 is formed such that the starting end portion and terminal end portion are connected to each other by a single-stroke line.

Focusing on the sequence of the first unit elements 30 in the scale width direction, the first conductive pattern 3 has a plurality of first element rows 31 (three in this example). Each first element row 31 comprises a row of first unit elements 30 having a shape that is reversed one by one. Two first element rows 31 adjacent to each other in the displacement detection direction are connected to each other at one end side of the extending direction.

As shown in FIG. 3, the starting end portion of the first conductive pattern 3 is connected to, for example, a test land or the like not shown in the figures, and is used to output a voltage signal or the like. The terminal end portion of the first conductive pattern 3 is electrically connected to the second conductive pattern 4 via the through hole 5.

The second conductive pattern 4 is formed in the second conductor layer 21b, as shown in FIG. 2. In the insulating plate 22a, the second conductor layer 21b is located on the opposite surface in the thickness direction from the first conductor layer 21a in which the first conductive pattern 3 is formed. The second conductive pattern 4 is configured by forming the second conductor layer 21b (e.g., a copper foil or the like) into a predetermined shape by pattern etching or the like. As shown in FIGS. 3 and 4, the second conductive pattern 4 has a shape of single stroke constituted by a plurality of second unit elements 40.

As shown in FIG. 4, the second conductive pattern 4 is arranged in an elongated region in the scale width direction. The second conductive pattern 4 has a shape of single stroke constituted by a plurality of second unit elements 40, as shown in FIGS. 3 and 4. The second unit elements 40 are arranged in an elongated area in the scale width direction in a matrix shape of p×q. The second conductive pattern 4 has three second element rows 41. Each second element row 41 is composed of second unit elements 40 aligned in the scale width direction.

The second conductive pattern 4 is formed in a region corresponding in the thickness direction of the base substrate section 22 (insulating plate 22a) to the first conductive pattern 3 that is electrically connected to the second conductive pattern 4, as shown in FIG. 4. The shape of the second conductive pattern 4 is substantially identical to that of the first conductive pattern 3, except that the respective fine bends of the pattern lines described above are symmetrical to each other. Since the configuration of the second conductive pattern 4 is very similar to that of the first conductive pattern 3, a detailed description will be omitted.

Each of the plurality of second unit elements 40 included in the second conductive pattern 4 corresponds, on a one-to-one basis, to the first unit element 30 included in the first conductive pattern 3. When viewed in the thickness direction of the base substrate section 22, the centers of the semicircular arc are aligned with each other between the first unit element 30 and the second unit element 40 corresponding to each other.

As shown in FIG. 5, between the first unit element 30 and the second unit element 40 corresponding to each other in the thickness direction of the base substrate section 22, the respective shapes of the semicircular arcs are in a complementary relationship. Accordingly, the first unit element 30 and the second unit element 40, when viewed in the thickness direction of the base substrate section 22, are aligned so that the ends of the semicircular arcs are connected to each other to substantially constitute a coil element 50 of a closed shape (specifically, a circular shape). The combination of the first conductive pattern 3 and the second conductive pattern 4 forms a number of coil elements 50 arranged in a p×q matrix. Since the first conductive pattern 3 and the second conductive pattern 4 are formed in a single stroke, a gap can be substantially reduced to zero between the coil elements 50 connected in a single stroke. In this example, a high-density arrangement of the coil elements 50 is realized by making the gap between the coil elements 50 adjacent to each other in the scale width direction substantially zero.

One coil element 50 can be considered as a coil in which the number of turns is 1. In FIG. 4, the thickness of the insulating plate 22a is exaggeratedly depicted to be large, but in reality the thickness of the insulating plate 22a is small. Accordingly, the coil plane of the coil is parallel to the plane in which the coil elements 50 are arranged in the matrix.

The through hole 5 electrically connects the first conductive pattern 3 and the second conductive pattern 4 to each other. The through hole 5 comprises a hole through the printed circuit board 21. The inner wall of the hole is plated with a conductor.

An electric current flows through a path formed from one first conductive pattern 3, one second conductive pattern 4, and a through hole 5 that conducts the first conductive pattern 3 and the second conductive pattern 4. Focusing on this, the first conductive pattern 3, the second conductive pattern 4, and the through hole 5 can be taken together as one unit detection set (detection set) S.

The relationship between the current and the direction of the magnetic field obeys the right-handed screw rule. In this example, in consideration of the right-handed screw rule, the first unit element 30 of the first conductive pattern 3 and the second unit element 40 of the second conductive pattern 4 are arranged so that the magnetic field generated in each coil element 50 when a current is tentatively applied to the unit detection set S is in the opposite direction to each other between adjacent coil elements 50.

As shown in FIG. 2, the unit detection sets S are arranged in pairs so that they correspond to each other in the thickness direction of the base substrate section 22. One unit detection set S is formed in a portion of the first conductor layer 21a and the second conductor layer 21b, and the other unit detection set S is formed in a portion of the third conductor layer 21c and the fourth conductor layer 21d. The configurations of the two unit detection sets S are identical to each other.

As shown in FIG. 5, in the printed circuit board 21, four pairs of unit detection set S are provided side by side at every predetermined second pitch C2 in the displacement detection direction. Each pair includes two unit detection sets S stacked in the thickness direction as described above.

The second pitch C2 is determined based on the first pitch C1 to have a predetermined relationship with the aforementioned first pitch C1. Specifically, as shown in formula (1), the second pitch C2 is set to be the sum of an integral multiple of the first pitch C1 and a quarter of the first pitch C1:

$$C2=(n+\tfrac{1}{4})\times C1 \tag{1}$$

wherein n is an integer. In this example, n=0, but this is not limited thereto.

In the magnetic linear sensor 100 of this example, of the two unit detection sets S shown in FIG. 2, the unit detection set S located on the far side from the scale 1 comprises the primary coil 61 that generates the AC magnetic field. The unit detection set S located on the side closer to the scale 1 comprises a secondary coil 62 that outputs a detection signal (e.g., a voltage signal) related to the induced current induced by the AC magnetic field.

Thus, the signal output section 6 of this example has a structure in which the primary coil 61 and the secondary coil 62 are stacked in the thickness direction of the printed circuit board 21.

In the magnetic linear sensor 100 of this example, as shown in FIGS. 1 and 5, four signal output sections 6 arranged at equal intervals in the displacement detection direction are provided. The four signal output sections 6 are provided at every second pitch C2.

In the following description, to identify each of the four signal output sections 6, they may be referred to as first signal output section (first detection section) 6a, second signal output section (second detection section) 6b, third signal output section (third detection section) 6c, and fourth signal output section (fourth detection section) 6d, in order from the left side shown in FIG. 5.

The signals (e.g., voltage signals) output by each signal output section 6 will be briefly described. When an alternating current of an appropriate frequency is passed through the primary coil 61, a magnetic field whose direction and strength change periodically is generated in the primary coil 61. On the other hand, an induced current in a direction that interferes with the change in the magnetic field of the coil is generated in the secondary coil 62. If a ferromagnetic body exists in the vicinity of the primary coil 61, this ferromagnetic body acts to strengthen the magnetic field generated by the primary coil 61. This effect becomes larger the closer the ferromagnetic body is to the primary coil 61.

Focusing on one ferromagnetic portion 13 provided by the magnetic response section 12, as the magnetic detection head 2 moves from one side of the stroke to the other, the primary coil 61 and the secondary coil 62 move closer to the ferromagnetic portion 13, but after the closest approach, they move apart. The induced current generated in the secondary coil 62 is an alternating current, but the magnitude of the amplitude of the current varies according to the positional relationship between the signal output section 6 and the ferromagnetic portion 13 of the magnetic response section 12.

Since the ferromagnetic portions 13 are actually arranged side by side at every first pitch C1, the change in the magnitude of the amplitude is a repetition of every first pitch C1. That is, if the position of the magnetic detection head 2 is taken on the horizontal axis and the magnitude of the amplitude is taken on the vertical axis, the relationship between the amplitude and the position becomes a periodic curve (specifically, a sine curve y=sin θ) having the first pitch C1 as a period. If it is possible to obtain this θ, it is possible to obtain the position of the magnetic detection head 2 in the first pitch C1, which is a repetition unit.

However, considering one period of the sine curve y=sin θ, there are two possible values of θ corresponding to y, except in special situations, and it cannot be determined to just one. Therefore, in this example, four signal output sections 6 are arranged at intervals determined by the second pitch C2 described above so that the positional relationship with the nearest ferromagnetic portion 13 is substantially displaced by ¼ of the first pitch C1.

Each of the first signal output section 6a, the second signal output section 6b, the third signal output section 6c, and the fourth signal output section 6d is separated from each other by ¼ of the first pitch C1 and therefore outputs a voltage signal that is out of phase with each other by 90°. If the voltage signal output by the first signal output section 6a is expressed as cos+ phase, the second signal output section 6b outputs a voltage signal of sin+ phase, the third signal output section 6c outputs a voltage signal of cos− phase, and the fourth signal output section 6d outputs a voltage signal of sin− phase.

As will be described in detail later, in this example, based on these four signals, it can be detected at which position the magnetic detection head 2 is in the first pitch C1.

The detection of the displacement of the measurement target by the magnetic linear sensor 100 of this example will now be briefly described.

Figure 6:
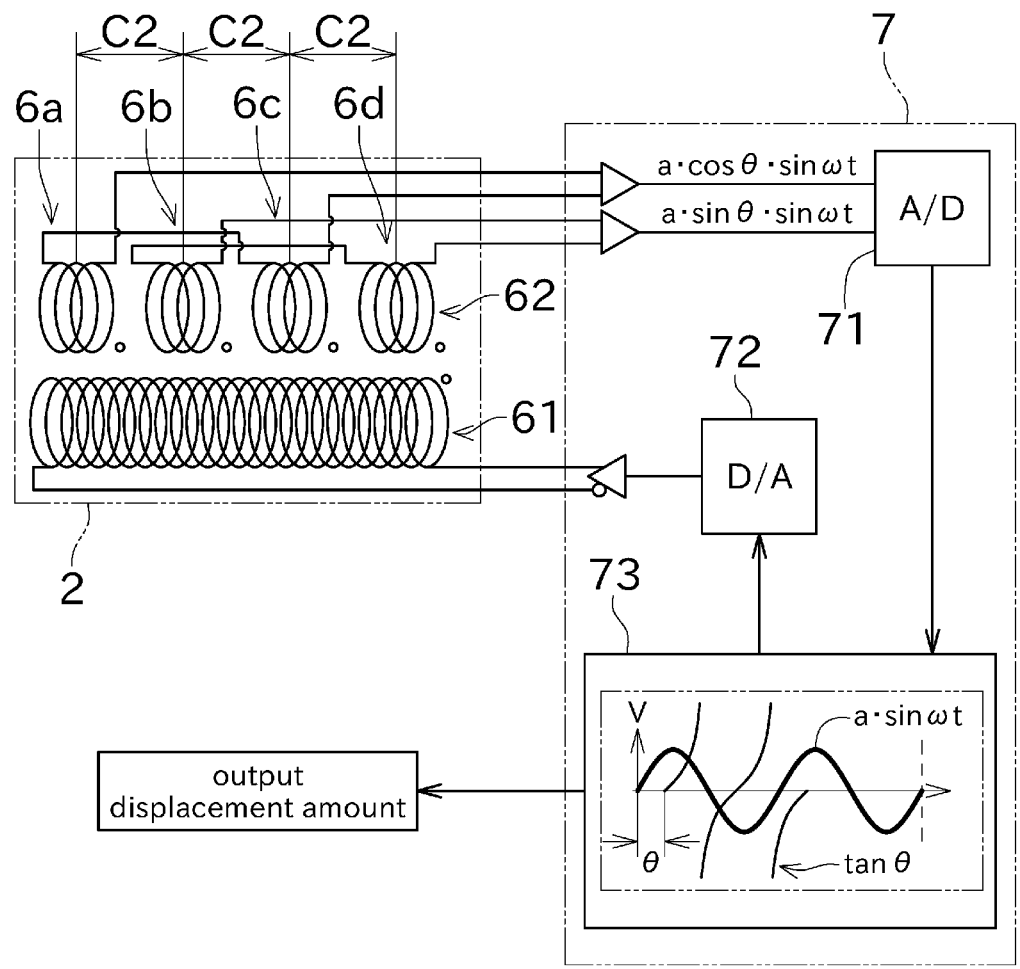
FIG. 6 is a block diagram showing the configuration of a magnetic linear sensor.

As shown in FIG. 6, the magnetic linear sensor 100 of this example is provided with a signal processing unit 7. The signal processing unit 7 processes the voltage signals output from the first signal output section 6a, the second signal output section 6b, the third signal output section 6c, and the fourth signal output section 6d.

The signal processing unit 7 is provided with, for example, an A/D converter 71, a D/A converter 72, and an arithmetic unit 73. The signal processing unit 7 calculates and outputs the displacement amount of the magnetic detection head 2 relative to the scale 1 based on the voltage signals output from the first signal output section 6a, the second signal output section 6b, the third signal output section 6c, and the fourth signal output section 6d while outputting the reference AC signal a·sin ωt to the primary coil 61.

In the primary coil 61, an AC magnetic field is generated by excitation with a reference AC signal output from the signal processing unit 7.

In each of the first signal output section 6a, the second signal output section 6b, the third signal output section 6c, and the fourth signal output section 6d, an AC signal having a different amplitude according to the relative position with the ferromagnetic portion 13 is induced in the secondary coil 62.

The signal processing unit 7 retrieves the first AC signal by extracting the difference of the outputs of the first signal output section 6a and the third signal output section 6c. The signal corresponding to the difference of the outputs can be easily retrieved by a known differential coupling. The first AC signal can be expressed by formula (2) when the phase representing the displacement of the magnetic detection head 2 is θ:

$$y1 = a \cdot \cos\theta \cdot \sin\omega t \qquad (2).$$

The signal processing unit 7 retrieves the second AC signal by extracting the difference between the second signal output section 6b and the fourth signal output section 6d. The second AC signal can be expressed by formula (3):

$$y2 = a \cdot \sin\theta \cdot \sin\omega t \qquad (3).$$

The arithmetic unit 73 divides the second AC signal y2 by the first AC signal y1. This result corresponds to the value of tan θ. Thereafter, the arithmetic unit 73 obtains the value of arctan as a result of the calculation. Thereby, θ can be obtained.

The above calculation can obtain the position of the magnetic detection head 2 in the first pitch C1 which is a repetition unit. However, it cannot specify at which first pitch C1 the magnetic detection head 2 is located. Therefore, the arithmetic unit 73 separately performs a counting process to count how many magnetic response sections 12 the magnetic detection head 2 has passed through. Based on this count value and the value of θ, the position of the magnetic detection head 2 in the movement stroke can be output.

In the magnetic linear sensor 100 of this example, each signal output section 6 has a number of coil elements 50 comprising first unit elements 30 and second unit elements 40 in a matrix arrangement. This means that the substantial number of turns of the primary coil 61 and the secondary coil 62 can be increased so that a large signal can be output.

Since each of the first signal output section 6a, the second signal output section 6b, the third signal output section 6c, and the fourth signal output section 6d is composed of a pattern comprising the printed circuit board 21, they can be formed extremely small. Accordingly, the first pitch C1, which is an arrangement pitch of the magnetic response section 12, can be made small (e.g., in mm).

If the first pitch C1 is made smaller, the second pitch C2 must also be made smaller accordingly. On the other hand, if a large number of coil elements 50 are not arranged, it is difficult to ensure signal strength. In this regard, in this example, the coil elements 50 are formed to be arranged side by side in an elongated region in the scale width direction. Therefore, it is possible to achieve both reducing the second pitch C2 and arranging a large number of coil elements 50.

As a result, the magnetic linear sensor 100 of this example can obtain a large detection signal and can make the target pitch (first pitch C1) processed by the signal processing unit 7 smaller so that the smallest unit that can be measured can be made smaller without improving the resolution of the A/D converter 71. In other words, the detection accuracy can be improved.

As explained above, the magnetic linear sensor 100 of this example detects the displacement of the measurement target in the displacement detection direction. The magnetic linear sensor 100 includes the scale 1 and the magnetic detection head 2. The magnetic detection head 2 is displaceable relative to the scale 1 in the displacement detection direction. The magnetic detection head 2 is placed on one side of the scale 1 in the scale thickness direction, which is a direction perpendicular to the displacement detection direction. The scale 1 includes the magnetic response section 12 placed on the side facing the magnetic detection head 2. The magnetic response section 12 is configured such that changes in the magnetic influence on the magnetic detection head 2 appear alternately and repeatedly at every first pitch C1 in the displacement detection direction. The magnetic detection head 2 includes the base substrate section 22 and the plurality of signal output sections 6. The base substrate section 22 includes at least one insulating plate 22a. The signal output sections 6 are placed on the insulating plate 22a and are arranged in the displacement detection direction at the second pitch C2 which is based on the first pitch C1. Each of the signal output sections 6 includes the first conductive pattern 3, the second conductive pattern 4, and the through hole 5. The second conductive pattern 4 is formed at a position different from the first conductive pattern 3 in the thickness direction of the insulating plate 22a. The through hole 5 electrically conducts the first conductive pattern 3 and the second conductive pattern 4. The first conductive pattern 3 and the second conductive pattern 4 are formed to arrange the coil elements 50 side by side in an elongated area in the scale width direction which is orthogonal to both the displacement detection direction and the scale thickness direction. The first conductive pattern 3 has a shape of single stroke connecting a plurality of first unit elements 30 constituting the coil elements 50. The second conductive pattern 4 has a shape of single stroke connecting a plurality of second unit elements 40 constituting the coil elements 50. The first unit element 30 and the second unit element 40 constitute a closed shape of the coil elements 50 when viewed in the thickness direction of the base substrate section 22.

As a result, the signal output section 6 is configured by a conductive pattern that is easy to precisely process. Consequently, the arrangement pitch of the signal output section 6 in the magnetic detection head 2 can be reduced. Therefore, the first pitch C1, which is the detection pitch of the magnetic linear sensor 100, can be made smaller. Accordingly, the magnetic linear sensor 100 can be made smaller, and the detection accuracy can be improved. And, a plurality of coil elements 50 can be configured from the first conductive pattern 3 and the second conductive pattern 4, and a large detection signal can be retrieved. In particular, it is easy to enlarge a number of coil elements 50 by the layout in which the coil elements 50 are arranged in an elongated area in the scale width direction.

The magnetic linear sensor 100 of this example includes a plurality of unit detection sets S. Each the unit detection set S comprises the first conductive pattern 3, the second conductive pattern 4, and the through hole 5. Each of the plurality of signal output sections 6 is provided with a plurality of unit detection sets S stacked in the thickness direction of the base substrate section 22.

As a result, a compact configuration can be achieved by making the signal output section 6 a multilayer structure.

In the magnetic linear sensor 100 of this example, the plurality of unit detection sets S include the first detection set and the second detection set. The first detection set constitutes the primary coil 61 that generates an AC magnetic field. The second detection set constitutes the secondary coil 62 that outputs an AC signal induced by the AC magnetic field. The primary coil 61 and the secondary coil 62 face each other in the thickness direction of the base substrate section 22.

As a result, the primary coil 61, which generates the AC magnetic field, and the secondary coil 62, which outputs the AC signal, can be compactly configured as a whole. In addition, the primary coil 61 and the secondary coil 62 can be arranged in close proximity to each other so that a configuration with good sensitivity can be provided.

In the magnetic linear sensor 100 of this example, the first conductive pattern 3 includes a plurality (three) of first element rows 31 which are arranged in the displacement detection direction. Each of the first element rows 31 includes the plurality of the first unit elements 30 which are arranged in the scale width direction. The second conductive pattern 4 includes a plurality (three) of second element rows 41 which are arranged in the displacement detection direction. Each of the second element rows 41 includes the plurality of the second unit elements 40 which are arranged in the scale width direction.

This allows the matrix arrangement of the coil elements 50 to be easily realized.

In the magnetic linear sensor 100 of this example, the plurality of signal output sections 6 include the first signal output section 6a, the second signal output section 6b, the third signal output section 6c, and the fourth signal output section 6d. The first signal output section 6a outputs an AC signal. The second signal output section 6b outputs an AC signal whose phase is 90° different from that of the first signal output section 6a. The third signal output section 6c outputs an AC signal whose phase is 180° different from that of the first signal output section 6a. The fourth signal output section 6d outputs an AC signal whose phase is 270° different from that of the first signal output section 6a. The first signal output section 6a, the second signal output section 6b, the third signal output section 6c, and the fourth signal output section 6d are arranged in order in the displacement detection direction.

This allows the plurality of signal output sections 6 to be configured in a simplified manner as a whole.

The magnetic linear sensor 100 of this example includes the signal processing unit 7 for processing signals output from the first signal output section 6a, the second signal output section 6b, the third signal output section 6c, and the fourth signal output section 6d. The signal processing unit 7 retrieves the displacement of the measurement target based on the first AC signal y1 and the second AC signal y2. The first AC signal y1 corresponds to the difference between the outputs of the first signal output section 6a and the third signal output section 6c. The second AC signal y2 corresponds to the difference between the outputs of the second signal output section 6b and the fourth signal output section 6d.

As a result, the displacement of the measurement target within each first pitch C1 can be accurately detected.

Figure 7:
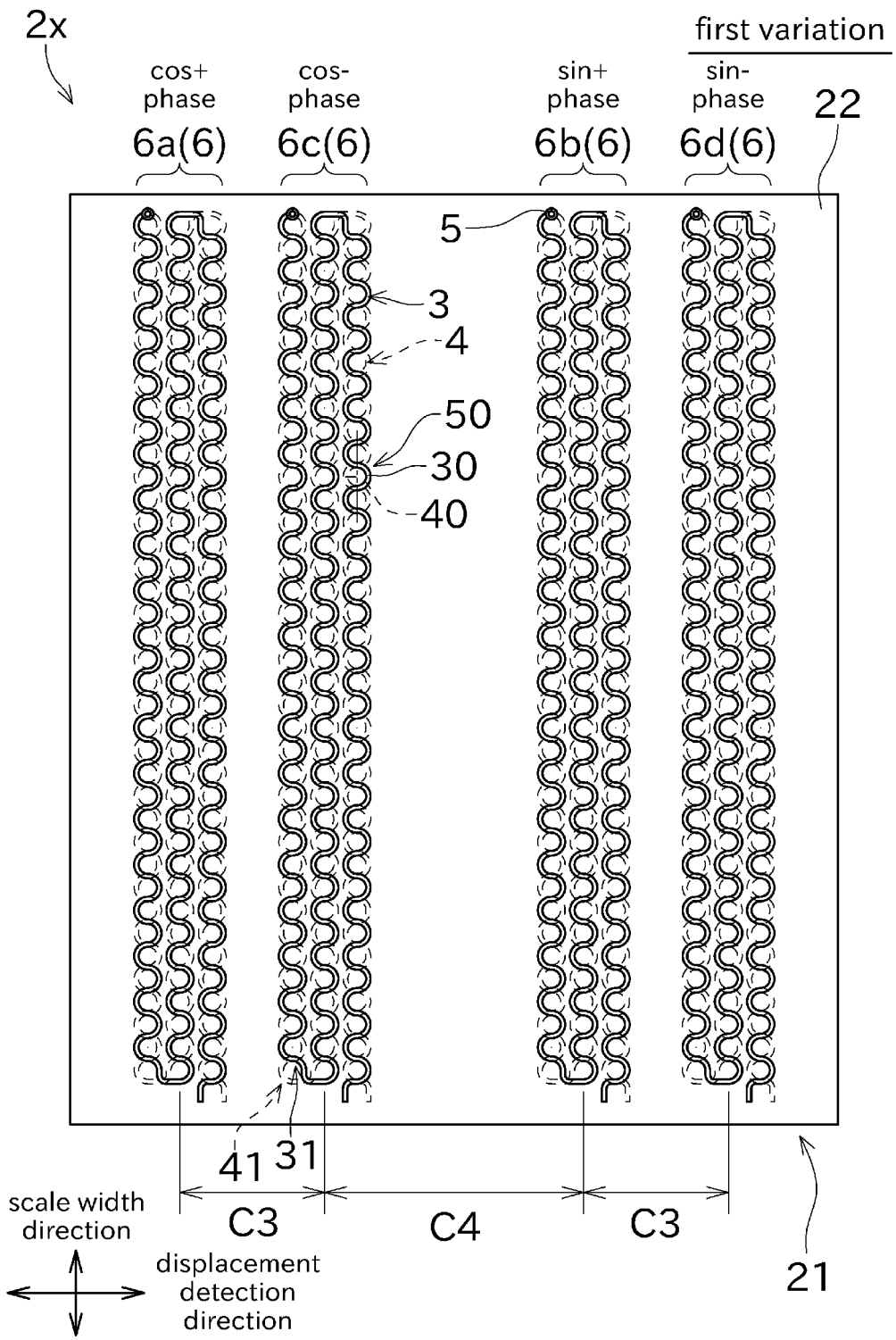
FIG. 7 is a front view showing the configuration of a magnetic detection head of a first variation.

Next, a first variation of the magnetic detection head 2 will be described. FIG. 7 is a plan view showing a configuration of a magnetic detection head 2x of the first variation. In the description of this variation, members identical or similar to those of the above-described example are given the same reference signs on the drawing, and descriptions thereof may be omitted.

In the magnetic detection head 2x of this variation, as shown in FIG. 7, four signal output sections 6 are provided in the displacement detection direction, in the order of first signal output section 6a, third signal output section 6c, second signal output section 6b, and fourth signal output section 6d.

The first signal output section 6a and the third signal output section 6c are provided side by side with a spacing of a third pitch C3. The second signal output section 6b and the fourth signal output section 6d are provided side by side with an interval of the third pitch C3. The third pitch C3 is set to half of the above-mentioned first pitch C1 (C3=C1/2).

That is, the first signal output section 6a and the third signal output section 6c, which differentially output the first AC signal a·cos θ·sin ωt, are adjacent to each other and are provided together on one side of the displacement detection direction. The second signal output section 6b and the fourth signal output section 6d, which differentially output the second AC signal a·sin θ·sin ωt, are adjacent to each other and are provided together on the other side of the displacement detection direction.

The third signal output section 6c and the second signal output section 6b are provided at a fourth pitch C4 to suppress the influence of the induced current of the other secondary coil 62 by the magnetic field of the one primary coil 61. The formula for determining the fourth pitch C4 is exactly the same as that for the second pitch C2 (C4=(n+¼)×C1). However, in the fourth pitch C4, unlike the second pitch C2, n is set to 1 or more.

With this configuration, the first signal output section 6a and the third signal output section 6c, which output the first AC signal a·cos θ·sin ωt, and the second signal output section 6b and the fourth signal output section 6d, which output the second AC signal a·sin θ·sin ωt, can be avoided from affecting each other. In addition, while achieving the above, the four signal output sections 6 as a whole can be arranged compactly.

As for the first signal output section 6a and the third signal output section 6c, there is no problem even if they are arranged in close proximity to each other since the mutual magnetic influence is canceled out by the differential coupling. The same can be said for the second signal output section 6b and the fourth signal output section 6d.

The spacing between the first signal output section 6a and the third signal output section 6c, and the spacing between the second signal output section 6b and the fourth signal output section 6d are all third pitch C3. The third pitch C3 is larger than the second pitch C2 described above with respect to the first pitch C1. Therefore, the first pitch C1 can be substantially smaller than that of the first example just by setting this third pitch C3 to the same degree as the pitch of the signal output section 6 (second pitch C2) in the first example. As a result, the detection accuracy of the magnetic linear sensor 100 can be further improved.

As described above, in this example, in the magnetic detection head 2x, the first signal output section 6a and the third signal output section 6c are placed adjacent to each other. The second signal output section 6b and the fourth signal output section 6d are placed adjacent to each other.

This makes it easy to reduce the first pitch C1 even if it is difficult to reduce the spacing of the signal output sections 6, for example, due to physical limitations of the layout. Thus, the detection accuracy can be improved.

Figure 8:
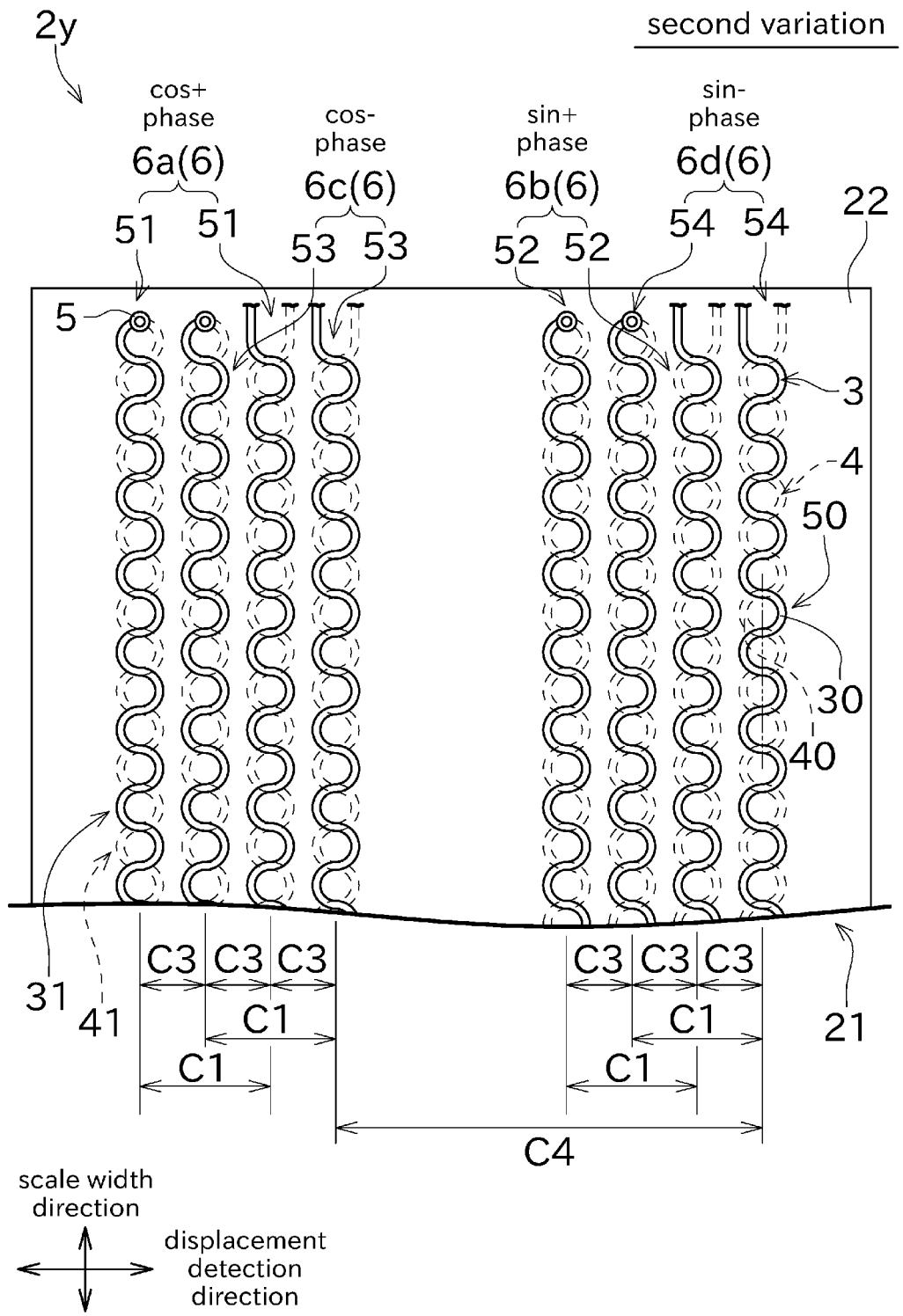
FIG. 8 is a front view showing the configuration of the magnetic detection head of a second variation.

Next, a second example of the magnetic detection head 2 will be described. FIG. 8 is a plan view showing a configuration of a magnetic detection head 2y of the second variation. In the description of this example, members identical or similar to those of the above-described example are given the same reference signs on the drawing, and descriptions thereof may be omitted.

In the magnetic detection head 2y of this variation, the first signal output section 6a and the third signal output section 6c are collectively provided on one side of the displacement detection direction, and the second signal output section 6b and the fourth signal output section 6d are collectively provided on the other side of the displacement detection direction.

As shown in FIG. 8, the first signal output section 6a has two rows of first coil element row 51. Each of the first coil element rows 51 includes coil elements 50 that are aligned along a straight line.

The third signal output section 6c has two rows of third coil element row 53. Each of the third coil element rows 53 includes coil elements 50 that are aligned along a straight line.

The first coil element rows 51 and the third coil element rows 53 are arranged alternately in the displacement detection direction. This arrangement pitch is equal to the third pitch C3 described above.

Similar to the above, the second signal output section 6b has two rows of the second coil element row 52. The fourth signal output section 6d has two rows of the fourth coil element row 54. The second coil element rows 52 and the fourth coil element rows 54 are arranged alternately in the displacement detection direction.

Similar to the configuration of FIG. 7, this configuration also allows the first pitch C1 to be substantially smaller. Therefore, the detection accuracy of the magnetic linear sensor 100 can be improved.

As described above, in this example, in the magnetic detection head 2y, the first coil element rows 51 and the third coil element rows 53 are alternately arranged in the displacement detection direction. The first coil element row 51 comprises the first element row 31 and the second element row 41. The first element row 31 and the second element row 41 constitute the first conductive pattern 3 and the second conductive pattern 4 included by the first signal output section 6a. The third coil element row 53 comprises the first element row 31 and the second element row 41. The first element row 31 and the second element row 41 constitute the first conductive pattern 3 and the second conductive pattern 4 included by the third signal output section 6c. In the magnetic detection head 2y, the second coil element rows 52 and the fourth coil element rows 54 are alternately arranged in the displacement detection direction. The second coil element row 52 comprises the first element row 31 and the second element row 41. The first element row 31 and the second element row 41 constitute the first conductive pattern 3 and the second conductive pattern 4 included by the second signal output section 6b. The fourth coil element row 54 comprises the first element row 31 and the second element row 41. The first element row 31 and the second element row 41 constitute the first conductive pattern 3 and the second conductive pattern 4 included by the fourth signal output section 6d.

This makes it easy to reduce the first pitch C1 even if it is difficult to reduce the spacing of the signal output sections 6, for example, due to physical limitations of the layout. Thus, the detection accuracy can be improved.

Figure 9:
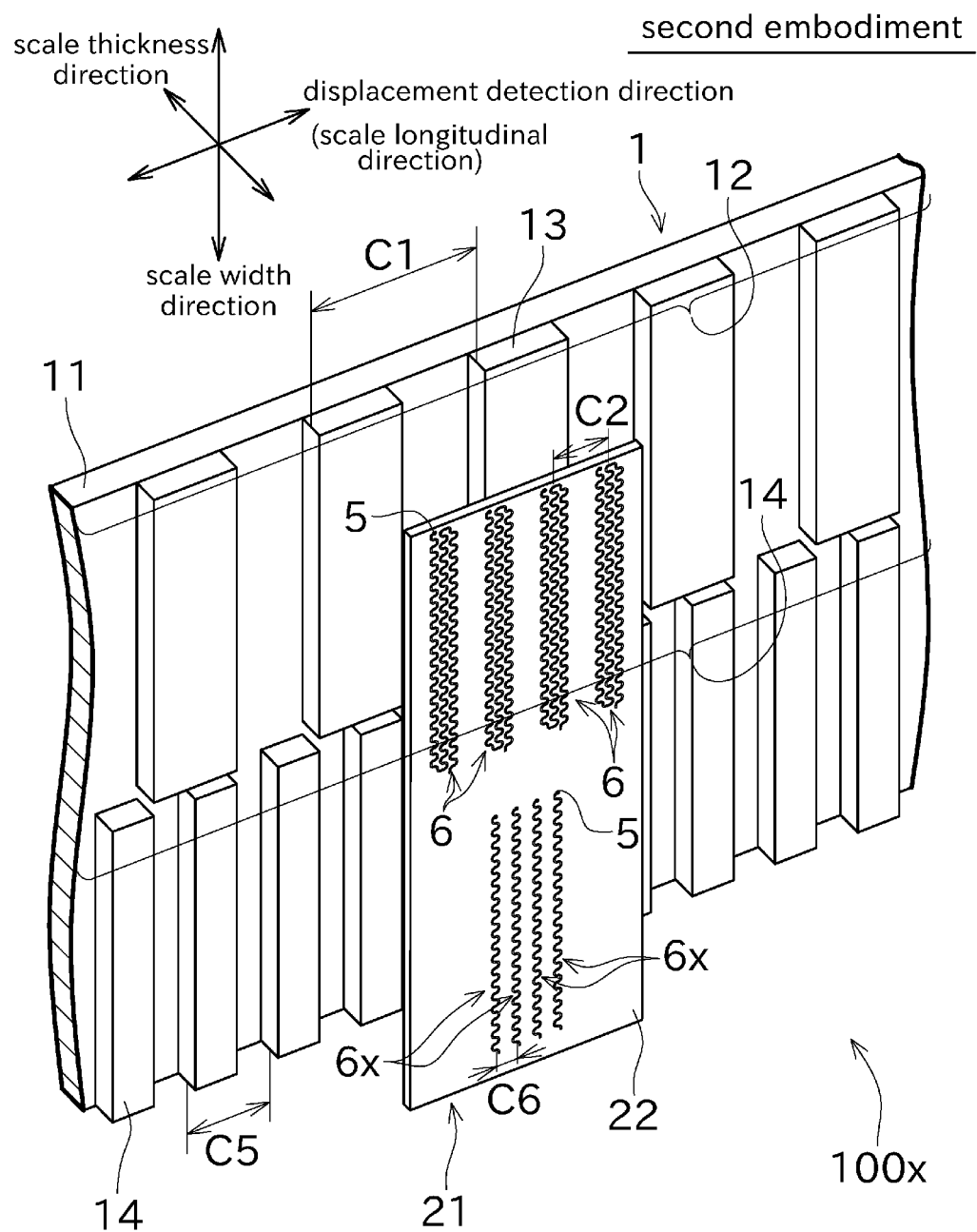
FIG. 9 is a diagonal view showing a second example of a magnetic linear sensor.

Next, a second example will be described. FIG. 9 is a diagonal view showing a configuration of a magnetic linear sensor 100x of the second example. In a description of this example, members identical or similar to those of the above-described example are given the same corresponding reference numerals on the drawings, and descriptions thereof may be omitted.

A scale 1 of the magnetic linear sensor 100*x* of this example includes a base member 11, a magnetic response section 12, and a second magnetic response section 14, as shown in FIG. 9. The magnetic response section 12 and the second magnetic response section 14 are arranged side by side in the scale width direction.

The configuration of the magnetic response section 12 is the same as that of the first example described above.

The configuration of the second magnetic response section 14 is substantially the same as that of the magnetic response section 12. However, in the second magnetic response section 14, the interval (fifth pitch C5, magnetic change pitch) at which the presence/absence or the strength/weakness of the magnetic responsiveness appears alternately and repeatedly in the longitudinal direction of the scale 1 is smaller than the interval (first pitch C1) in the magnetic response section 12.

As shown in FIG. 9, the printed circuit board 21 of this example has four signal output sections 6 arranged in the displacement detection direction and four magnetic detection signal output sections (magnetic detection sections) 6*x* arranged in the displacement detection direction. The signal output sections 6 are arranged to face the magnetic response section 12. The magnetic detection signal output sections 6*x* are arranged to face the second magnetic response section 14.

The configuration of the magnetic detection signal output section 6*x* is generally the same as that of the signal output section 6. The magnetic detection signal output section 6*x* consists of, for example, one coil element row. The magnetic detection signal output sections 6*x* are provided at every predetermined sixth pitch C6 in the displacement detection direction. The magnetic detection signal output section 6*x* may comprise two or more coil element rows. Since the relationship between the sixth pitch C6 and the fifth pitch C5 is the same as the relationship between the second pitch C2 and the first pitch C1, the description is omitted.

The signal output section 6 outputs a signal for determining a position of the magnetic detection head 2 in the first pitch C1. The magnetic detection signal output section 6*x* outputs a signal for determining a position of the magnetic detection head 2 in the fifth pitch C5. By not making the first pitch C1 equal to an integral multiple of the fifth pitch C5 or the like, it is possible to identify just one position of the magnetic detection head 2 in the movement stroke by a combination of the two positions. In this configuration, the so-called absolute position can be detected without the counting process described above.

As described above, in the magnetic linear sensor 100*x* of this example, the scale 1 includes the second magnetic response section 14. The second magnetic response section 14 is configured such that changes in the magnetic influence on the magnetic detection head 2 appear alternately and repeatedly at every fifth pitch C5 in the displacement detection direction. The fifth pitch is different from the first pitch C1. The magnetic detection head 2 includes a plurality of magnetic detection signal output sections 6*x*. The plurality of magnetic detection signal output sections 6*x* are arranged in the displacement detection direction at a sixth pitch C6 which is based on the fifth pitch C5.

This allows the position of the measurement target to be retrieved more appropriately using two magnetic response sections whose magnetic influence changes at different pitches from each other.

Although the preferred example and the modifications of our sensors have been described above, the configurations described above may be modified as follows, for example.

Figure 10A:
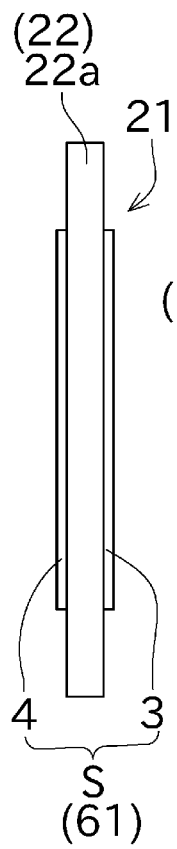
FIGS. 10(a)-10(c) are side views schematically showing a configuration of a printed circuit board of another example.
Figure 10B:
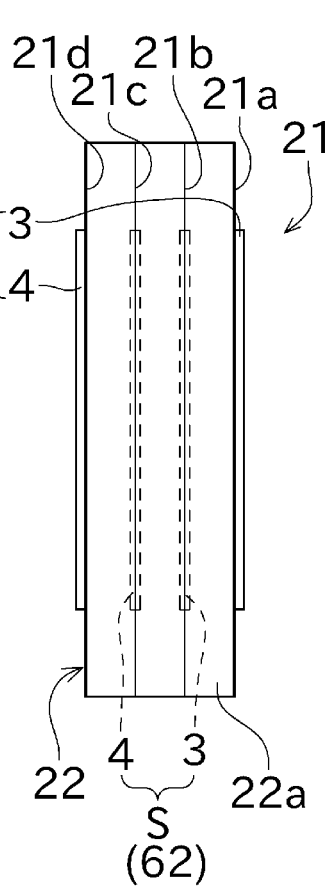
Figure 10C:
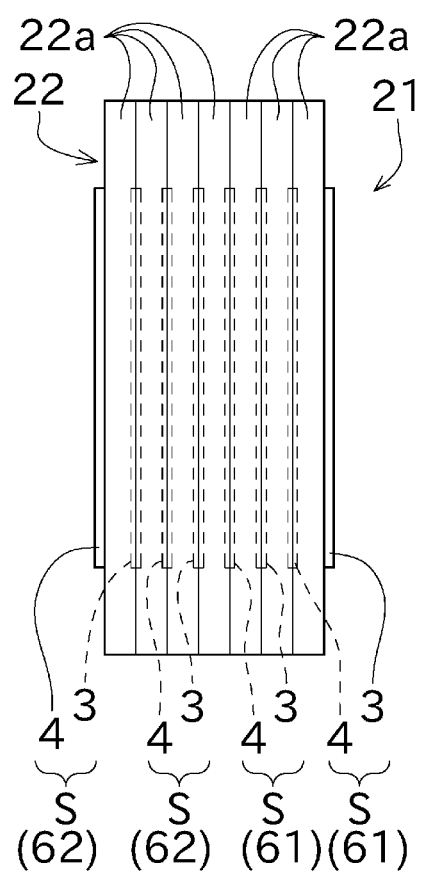

The printed circuit board 21 may comprise a double-sided board, as shown in FIG. 10(*a*). In this example, the first conductive pattern 3 and the second conductive pattern 4 formed on the printed circuit board 21 comprise only one of the primary coil 61 and the secondary coil 62.

The printed circuit board 21 may be configured as shown in FIG. 10(*b*). In this configuration, the primary coil 61 comprises a first conductive pattern 3 formed on the first conductor layer 21*a*, and a second conductive pattern 4 formed on the fourth conductor layer 21*d*. The secondary coil 62 comprises a first conductive pattern 3 formed on the second conductor layer 21*b* and a second conductive pattern 4 formed on the third conductor layer 21*c*. In FIG. 10(*b*), the first conductive pattern 3 and the second conductive pattern 4 of the secondary coil 62 are disposed between the first conductive pattern 3 and the second conductive pattern 4 comprising the primary coil 61. In this example, a compact arrangement of the primary coil 61 and the secondary coil 62 can be realized.

Three or more pairs of the first conductive pattern 3 and the second conductive pattern 4 may be arranged in the thickness direction of the printed circuit board 21. FIG. 10(*c*) shows an example in which the printed circuit board 21 comprises an eight-layer board. In this example, two unit detection sets S are used as the primary coils 61 and the remaining two unit detection sets S are used as the secondary coils 62. Which unit detection sets S are used as the primary coil 61 and the secondary coil 62 is arbitrary.

In the configuration of FIGS. 10(*b*) and 10(*c*), only the primary coil 61 can be configured from all of the first conductive pattern 3 and the second conductive pattern 4, or only the secondary coil 62 can be configured.

The scale 1 is not limited to the above-described configuration and can be configured in any suitable manner as long as different magnetic properties (magnetic strength, the direction of the generated magnetic field or the like) are repeated. For example, the base member 11 and the magnetic response section 12 may be integrally formed using a ferromagnetic material. The magnetic response section 12 may be configured by arranging ferromagnetic bodies and weak magnetic bodies/non-magnetic bodies alternately in the longitudinal direction of the scale 1. The repetition of the change in magnetic properties may be achieved by arranging the N and S poles of the magnets.

The scale 1 may be provided one on each of both sides of the printed circuit board 21 in the thickness direction to sandwich the magnetic detection head 2 (printed circuit board 21). In this example, a larger detection signal can be easily retrieved.

The first conductive pattern 3 and the second conductive pattern 4 may have less than two or more than four element rows. Each element row may comprise a minimum of two unit elements.

In the above example, as shown in FIG. 3, a gap is formed between adjacent coil elements 50 in the displacement detection direction. However, it is also possible to form the first conductive pattern 3 and the second conductive pattern 4 so that this gap is substantially zero. In this example, further densification of the coil elements 50 can be achieved.

The first unit element 30 and the second unit element 40 provided by each of the first conductive pattern 3 and the second conductive pattern 4 are not limited to a semicircular shape, and may be formed in a shape comprising, for example, two or more line segments. That is, the coil element 50 configured from the first unit element 30 and the second unit element 40 is not limited to a circle, and may be configured, for example, as a polygon surrounded by four or more line segments.

The single stroke shape of the first conductive pattern 3 may be configured to repeat a unit pattern connecting the first unit elements 30 in a 2×2 matrix shape, as shown in FIG. 11(a). As shown in FIGS. 11(b) and 11(c), it may be configured to repeat a unit pattern connecting the first unit elements 30 in the form of a 2×3 matrix. The same can be said for the single stroke shape of the second conductive pattern 4.

The arithmetic unit 73 can also obtain 0 by a method other than calculating tan θ. Specifically, the phase of the second AC signal y2 is shifted by 90° by a known shift circuit and added to the first AC signal y1. The signal after the addition can be expressed as $a \cdot \sin(\omega t + \theta)$ by the well-known addition theorem of trigonometric functions. The arithmetic unit 73 retrieves θ by measuring the phase difference (specifically, the difference in the timing at which each signal intersects with zero) between this signal and the reference AC signal $a \cdot \sin \omega t$.

The invention claimed is:

1. A magnetic linear sensor that detects a displacement of a measurement target in a displacement detection direction, comprising:
    a linear scale; and
    a sensor head displaceable relative to the linear scale in the displacement detection direction; wherein
    the sensor head is arranged on one side of the linear scale in a first direction perpendicular to the displacement detection direction,
    the linear scale includes a first magnetic response section arranged on the side facing the sensor head,
    the first magnetic response section comprises a plurality of ferromagnetic portions and is configured such that changes in magnetic influence on the sensor head appear alternately and repeatedly at every first pitch in the displacement detection direction,
    the sensor head comprises:
    a base substrate section including at least one insulating plate; and
    a plurality of detection sections placed on the insulating plate and arranged in the displacement detection direction at every second pitch which is based on the first pitch,
    each of the detecting sections comprises:
    a first conductive pattern;
    a second conductive pattern formed at a position different from the first conductive pattern in a thickness direction of the insulating plate; and
    a through hole electrically conducting the first conductive pattern and the second conductive pattern,
    the first conductive pattern and the second conductive pattern are formed to arrange coil elements side by side in an elongated area in a second direction orthogonal to both the displacement detection direction and the first direction,
    the first conductive pattern has a shape of a single stroke connecting a plurality of first unit elements constituting the coil elements,
    the second conductive pattern has a shape of a single stroke connecting a plurality of second unit elements constituting the coil elements, and
    the first unit element and the second unit element constitute a closed shape of the coil element when viewed in the thickness direction of the base substrate section,
    wherein each coil element within one of the plurality of detection sections detects a same one of the plurality of ferromagnetic portions.

2. The magnetic linear sensor according to claim 1, further comprising:
    a plurality of detection sets each of which includes the first conductive pattern, the second conductive pattern, and the through hole, wherein
    each of the plurality of the detection sections includes a plurality of the detection sets stacked in the thickness direction of the base substrate section.

3. The magnetic linear sensor according to claim 2, wherein
    the plurality of the detection sets comprise:
    a first detection set constituting a primary coil that generates an AC magnetic field;
    a second detection set constituting a secondary coil that outputs an AC signal induced by the AC magnetic field, and
    the primary coil and the secondary coil face each other in the thickness direction of the base substrate section.

4. The magnetic linear sensor according to claim 1, further comprising:
    a plurality of detection sets each of which includes the first conductive pattern, the second conductive pattern, and the through hole, wherein
    the plurality of the detection sets comprise:
    a first detection set constituting a primary coil that generates an AC magnetic field;
    a second detection set constituting a secondary coil that outputs an AC signal induced by the AC magnetic field, and
    the first conductive pattern and the second conductive pattern constituting the secondary coil are arranged between the first conductive pattern and the second conductive pattern constituting the primary coil in the thickness direction of the base substrate section.

5. The magnetic linear sensor according to claim 1, wherein
    the first conductive pattern comprises a plurality of first element rows arranged in the displacement detection direction, each of the first element rows including the plurality of the first unit elements arranged in the second direction, and
    the second conductive pattern comprises a plurality of second element rows arranged in the displacement detection direction, each of the second element rows including the plurality of the second unit elements arranged in the second direction.

6. The magnetic linear sensor according to claim 1, wherein
    the plurality of the detecting sections comprise:
    a first detection section that outputs an AC signal;
    a second detection section that outputs an AC signal whose phase is 90° different from that of the first detection section;
    a third detection section that outputs an AC signal whose phase is 180° different from that of the first detection section;
    a fourth detection section that outputs an AC signal whose phase is 270° different from that of the first detection section, and
    the first detection section, the second detection section, the third detection section, and the fourth detection section are arranged in order in the displacement detection direction.

7. The magnetic linear sensor according to claim 1, further comprises:
- a first detection section that outputs an AC signal;
- a second detection section that outputs an AC signal whose phase is 90° different from that of the first detection section;
- a third detection section that outputs an AC signal whose phase is 180° different from that of the first detection section; and
- a fourth detection section that outputs an AC signal whose phase is 270° different from that of the first detection section, wherein
- the first detection section and the third detection section are adjacent to each other in the displacement detection direction, and
- the second detection section and the fourth detection section are adjacent to each other in the displacement detection direction.

8. The magnetic linear sensor according to claim 5, further comprising:
- a first detection section that outputs an AC signal;
- a second detection section that outputs an AC signal whose phase is 90° different from that of the first detection section;
- a third detection section that outputs an AC signal whose phase is 180° different from that of the first detection section; and
- a fourth detection section that outputs an AC signal whose phase is 270° different from that of the first detection section, wherein
- first coil element rows each of which comprises the first element row and the second element row, the first element row and the second element row constituting the first conductive pattern and the second conductive pattern included by the first detection section; and
- third coil element rows each of which comprises the first element row and the second element row, the first element row and the second element row constituting the first conductive pattern and the second conductive pattern included by the third detection section; are alternately arranged in the displacement detection direction, and
- second coil element rows each of which comprises the first element row and the second element row, the first element row and the second element row constituting the first conductive pattern and the second conductive pattern included by the second detection section; and
- fourth coil element rows each of which comprises the first element row and the second element row, the first element row and the second element row constituting the first conductive pattern and the second conductive pattern included by the fourth detection section; are alternately arranged in the displacement detection direction.

9. The magnetic linear sensor according to claim 6, further comprising:
- a signal processor that processes signals output from the first detection section, the second detection section, the third detection section, and the fourth detection section, wherein
- the signal processing unit retrieves the displacement of the measurement target based on:
- a first AC signal corresponding to a difference between the outputs of the first detection section and the third detection section; and
- a second AC signal corresponding to a difference between the outputs of the second detection section and the fourth detection section.

10. The magnetic linear sensor according to claim 1, wherein
- the linear scale comprises a second magnetic response section,
- the second magnetic response section is configured such that changes in magnetic influence on the sensor head appear alternately and repeatedly at every magnetic change pitch in the displacement detection direction, the magnetic change pitch being different from the first pitch,
- the sensor head comprises a plurality of magnetic detection sections, and
- the plurality of the magnetic detection sections are arranged in the displacement detection direction at every pitch which is based on the magnetic change pitch.

11. The magnetic linear sensor according to claim 1, wherein
- the linear scale is provided on each of both sides of the sensor head in the first direction to sandwich the sensor head.

* * * * *